(12) United States Patent
Abushagur

(10) Patent No.: US 6,385,364 B1
(45) Date of Patent: May 7, 2002

(54) OPTICAL SWITCH

(76) Inventor: Mustafa A. G. Abushagur, 2203 Rhett Butler La., Huntsville, AL (US) 35803

( * ) Notice: Subject to any disclaimer, the term of this patent is extended or adjusted under 35 U.S.C. 154(b) by 0 days.

(21) Appl. No.: 09/595,495

(22) Filed: Jun. 16, 2000

Related U.S. Application Data

(60) Provisional application No. 60/139,598, filed on Jun. 17, 1999.

(51) Int. Cl.$^7$ ................................................. G02B 6/35
(52) U.S. Cl. ............................. 385/16; 385/18; 385/22; 385/20
(58) Field of Search ........................ 385/16–18, 20–22

(56) References Cited

U.S. PATENT DOCUMENTS

| | | | |
|---|---|---|---|
| 5,255,332 A | * 10/1993 | Welch et al. .................. | 385/17 |
| 5,367,584 A | 11/1994 | Ghezzo et al. | |
| 5,771,320 A | 6/1998 | Stone | |
| 5,841,917 A | * 11/1998 | Jungerman et al. ........... | 385/17 |
| 5,903,687 A | * 5/1999 | Young et al. .................. | 385/17 |
| 5,960,132 A | 9/1999 | Lin | |
| 5,982,554 A | 11/1999 | Goldstein et al. | |
| 6,097,859 A | * 8/2000 | Solgaard et al. ............... | 385/17 |
| 6,320,996 B1 | * 11/2001 | Scobey et al. ................. | 385/18 |
| 2001/0002940 A1 | * 6/2001 | Glance ......................... | 385/18 |

* cited by examiner

*Primary Examiner*—Rodney Bovernick
*Assistant Examiner*—Sarah U. Song
(74) *Attorney, Agent, or Firm*—Luedeka, Neely & Graham, P.C.

(57) ABSTRACT

An optical switch guides data transmitting light beams along free space switching paths from one or more input optical fibers to one or more output optical fibers. The optical switch includes a microchip base member, diffractive, refractive or reflective optical elements positioned on carrier panels, and actuators for moving the carrier panels. The optical elements are positionable by the actuators to guide light beams emitted by the input optical fibers in free space to the receiving output optical fibers. The actuators may be linear and/or rotary. Switching of light beams can be from one input port to one or many output ports, and vice versa, to form a free space optical cross-connect switch and router.

9 Claims, 7 Drawing Sheets

OPTICAL SWITCH

This application claims the benefit of U.S. Provisional Application No. 60/139,598, filed Jun. 17, 1999, and entitled "Optical Cross Connect Switch."

BACKGROUND

1. Field of the Invention

The present invention relates generally to switching devices. More particularly, the present invention relates to an optical switch for selectively redirecting one or more beams of data transmitting light carried by one or more light transmitting input conduits to one or more light transmitting output conduits.

2. Background of the Invention

Today's high speed communications systems commonly employ fiber optic communications channels with electronic switches and routers. However, the combination of optical data transmission and electronic switching requires numerous optical-to-electrical-to-optical conversions. This is costly in terms of bandwidth limitations, power consumption, size of system components, and overall system throughput.

At the core of today's network is the switching fabric. A major function of the switch is to reroute optical signals from an array of input fibers to an array of output fibers. Switches currently in use require conversion of the optical signals received on fiber channels into electrical signals, electrically routing these signals, and then converting them back into optical signals and launching them into the fiber channels. This complex set of conversions creates significant overhead in terms of power, data throughput, and latency. Such switches are blocking (i.e., disallow signal fan-out and fan-in) and are non-transparent (i.e, the signal does not stay in optical form). Also the bandwidth (data rate) of the signal must be within that of the electronic switch, which can be orders of magnitude less than that of the optical signal. Thus, the router becomes the system's bottleneck.

What is needed, therefore, is an improved optical switching device that avoids bandwidth and other limitations present in electro-optical switches.

SUMMARY OF THE INVENTION

The present invention eliminates the difficulties and disadvantages of the prior art by providing an optical cross connect switch that is capable of optically transferring optical beams propagating in an input optical fiber to one or several output optical fibers. The optical cross connect switch can be designed such that it distributes the optical signal propagating in either one or several input optical fibers to either one or many output optical fibers in any predetermined combination. Additionally, the optical cross connect switch of the present invention can be programmed for any specific optical connections that are to be formed between input and output optical fibers.

The optical cross connection switch of the present invention can be used in the switching fabrics of fiber optic networks. The optical cross connect switch removes the bottleneck of converting light signals into electrical signals and back into optical signals. Additionally, the present invention can be used in switching and routing circuits for many different types of fiber optic networks.

Additionally, the optical cross connect switch of the present invention may use microelectromechanical systems (MEMS), diffractive, reflective and refractive optical elements and fibers. The use of MEMS devices can allow the optical cross connection switch of the present invention to be made compact in size, can decrease the power consumption needed to switch the optical signals, and switch the optical signal at a relatively high speed. Further, the use of diffractive optical elements provides the capability of switching the optical signal in a flexible way. Further, the diffractive optical elements may minimize signal loss caused by coupling. Also, because the present invention uses optical rather than electrical switching, the switching time is typically less dependent on the size of the network (i.e., the number of input and output fibers).

This invention introduces a new approach to implement a transparent all-optical, non-blocking crossconnect switch for routing optical network traffic. This approach is based on the combination of MEMS, diffractive optical elements, and optical fibers. The current invention can be used in the switching fabrics of fiber optic telecommunication as well as computer networks. It can remove the bottlenecks of converting between optical and electrical signals and the bandwidth limitations of current electro-optic switches. Additionally, the present invention can be used in switching and routing circuits for many types of fiber optic networks since it is protocol independent. It is not limited to today's Synchronous Optical NETwork (SONET) and Synchronous Digital Hierarchy (SDH) data streams, but can also just as easily carry protocols such as Asynchronous Transfer Mode (ATM), Internet Protocol (IP), and Gigabit Ethernet. Compared to mirror-based MEMS switch approaches, the proposed switch needs far fewer actuators, which enhances size, yield, cost, and power consumption. Also, it has improved optical coupling efficiencies. In addition, the present invention may offer significant reconfiguration speed and routing flexibility advantages.

The present invention is implemented using several exemplary embodiments each of which uses diffractive, refractive or reflective optical elements to route the light signals from the input to the output fibers. Diffractive optical elements (DOE) provide a better alternative to mirror based routers because of their high diffraction efficiencies (which can result in very low coupling losses) and functional flexibility in combining multiple optical functions in a single DOE element. This eliminates the need for GRIN or ball lenses and also allows routing the optical beam from a single input fiber to multiple output fibers simultaneously.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
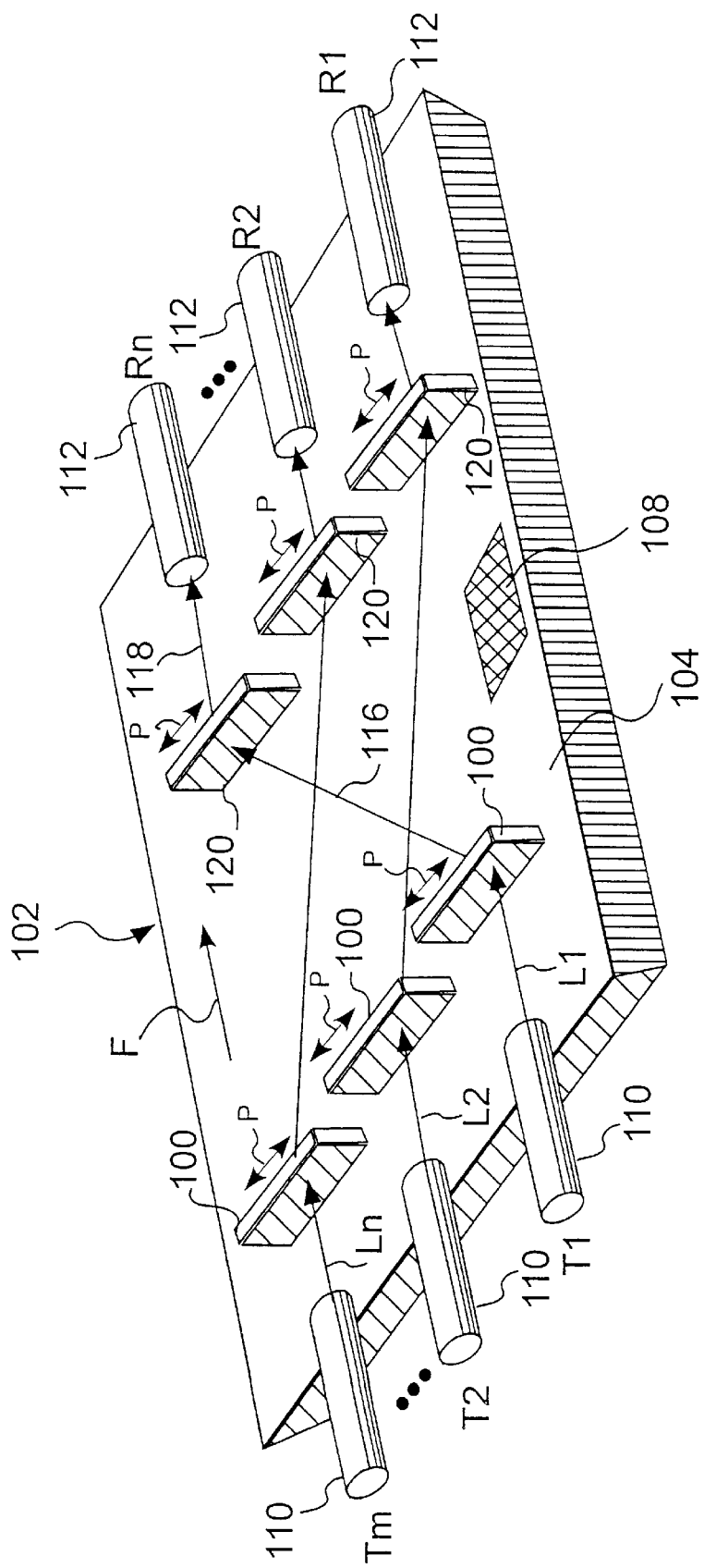
FIG. 1 is a diagrammatic view of an optical switch using linear translation optical switching elements according to the invention.

With reference now to the drawings in which like reference characters designate like or similar parts throughout the several views, a first embodiment of an optical switch 102 according to the invention is shown in FIG. 1. The optical switch 102 is formed on a base 104, which in a preferred embodiment is a microchip or semiconductor substrate. The optical switch 102 is used to redirect or switch one or more data transmitting input light beams L1–Ln, which are traveling in free-space along the direction generally indicated by arrow F, exiting from one or more light transmitting input optical fibers 110 (T1–Tm) to one or more target devices, such as one or more light transmitting output optical fibers 112 (R1–Rn). The optical switch 102 includes one or more input ports for receiving one or more input optical fibers 110, and one or more output ports are provided to receive one or more output optical fibers 112. An electronic controller 108, preferably integrated into the base 104, controls operation of the optical switch 102.

It will be appreciated that the number of input optical fibers 110 connected to the optical switch 102 may be the same as or different than the number of output optical fibers 112. As each input light beam L1–Ln exits an input optical fiber 110, the light beam L1–Ln enters free space before encountering an input optical switching element 100. The input optical switching element 100 redirects the light beam L1–Ln to an appropriate output optical switching element 120 which in turn redirects the light beam onto an output optical fiber 112. The optical switching elements 100 and 120 are positioned to redirect the light beams L1–Ln by actuators that move along the direction indicated by arrow P.

Figure 2:
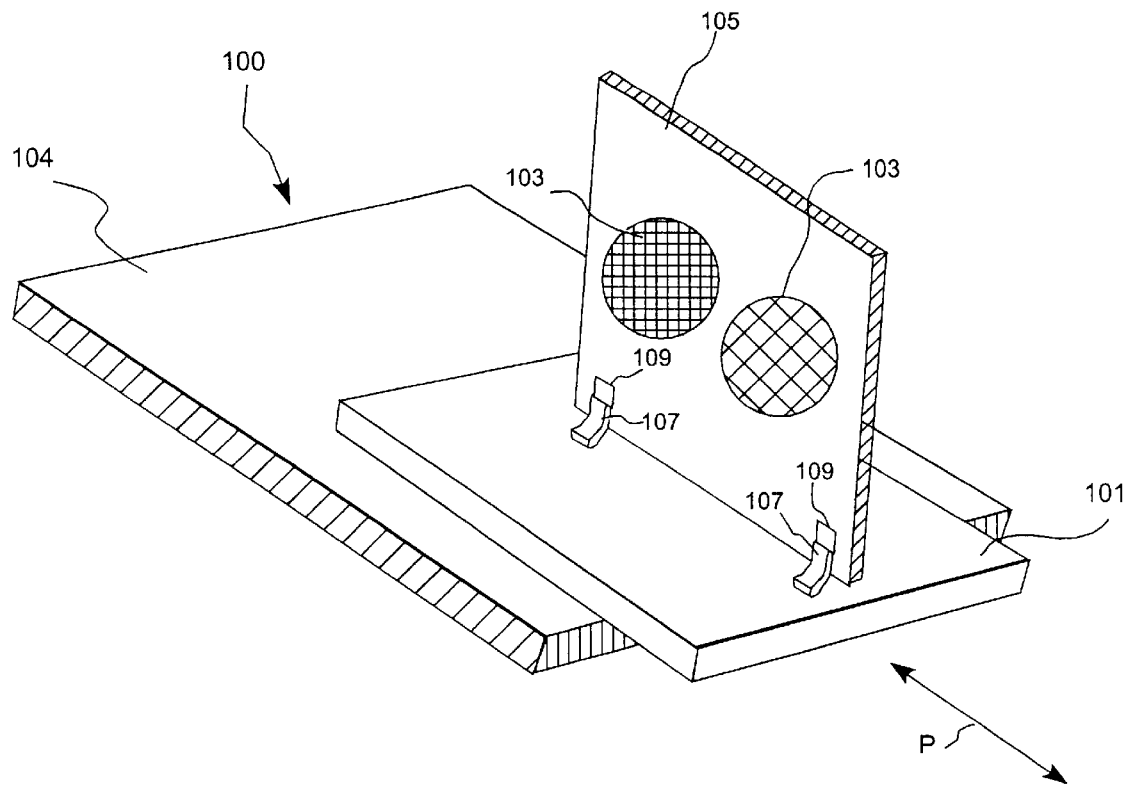
FIG. 2 is a perspective view of a linear translation optical switching element shown in FIG. 1.

Shown in FIG. 2 is a perspective view of an input optical switching element 100, it being understood that each output optical switching element 120 is highly similar in configuration and function. Each switching element 100 is attached to the base 104 and includes a carrier panel 105, one or more diffractive (may also be refractive) optical elements 103 attached to the carrier panel 105, and an actuator 101 controlled by controller 108. The base 104, the carrier panel 105 and the actuator 101 are made from a stiff resilient material, such as silicon-based materials commonly used in micromachining fabrications. The optical elements 103 are preferably fabricated from glass (such as poly-silicon or silicon dioxide) using a micromachining process or using post processes commonly employed for micro-optics fabrications.

In a preferred embodiment, the number of optical elements 103 attached to the carrier panel 105 of the input optical switching elements 100 is equal to the number of output optical fibers 112 so that each beam L1–Ln can be routed to any one of the output optical fibers 112 by placing the proper optical element in the path of the optical beam to be redirected. Likewise, the number of optical elements 103 attached to the carrier panel 105 of the output optical switching elements 120 is equal to the number of input optical fibers 110 so that each output optical fiber 112 can receive any one of the beams L1–Ln.

Figure 3:
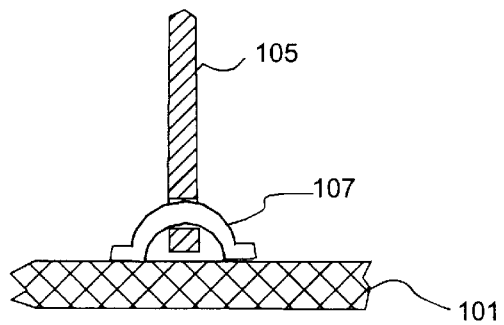
FIG. 3 is a side view of the optical switching element of FIG. 2.

Preferably, the carrier panel 105 is pivotally connected to the actuator 101 by one or more hinges 107. The hinges 107 enable the carrier panel 105 to be positioned vertically on the actuator 101. In FIG. 3, a side-view of the carrier panel 105 and a hinge 107 is shown. The hinge 107 passes through a hole 109 formed in the lower portion of the carrier panel 105. When the actuator 101 is energized, it moves linearly as generally indicated by arrow P.

Figure 4:
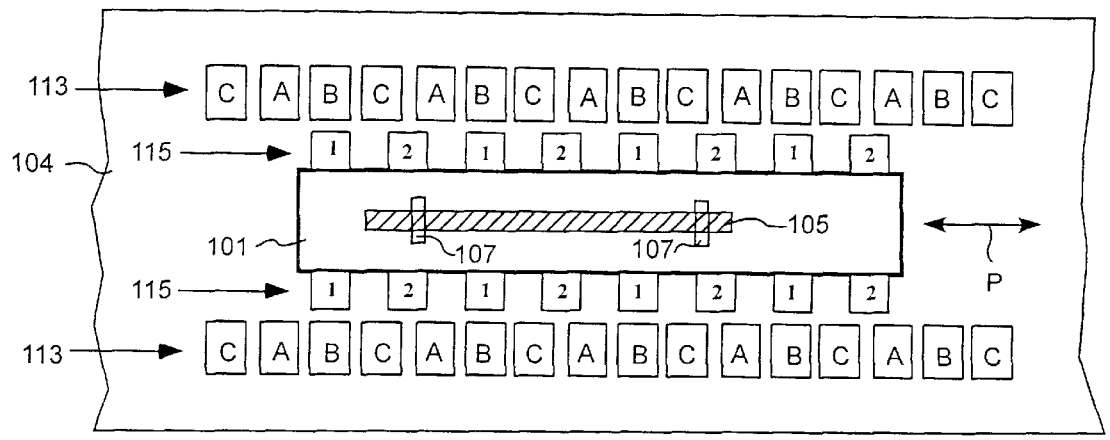
FIG. 4 is a top view of a linear translation sliding actuator for carrying an optical switching element according to the invention.

In FIG. 4, a preferred embodiment of a sliding linear actuator 101 is shown.

The actuator 101 is moved electrostatically by the controller 108 based on electrical excitation of a series of opposite polarity poles 113 and 115 using three-phase bipolar square-wave excitation. For purposes of clarifying the switching methodology, the outer poles 113 are alternately labeled A, B and C, and the inner poles 115 are alternately labeled 1 and 2. Cycling voltage applied to the outer poles A, B and C moves the actuator. To move the actuator to the right, a voltage is first applied to outer pole A which in-turn attracts inner pole 2, then a voltage is applied to outer pole B to attract inner pole 1, then a voltage is applied to outer pole C, and so on. Excitation of the poles in this order causes a continuous motion of the actuator to the right. To move the actuator to the left, the excitation should go in the C-B-A sequence. The speed of the movement is controlled by the amplitude and frequency of the applied square wave.

Figure 5:
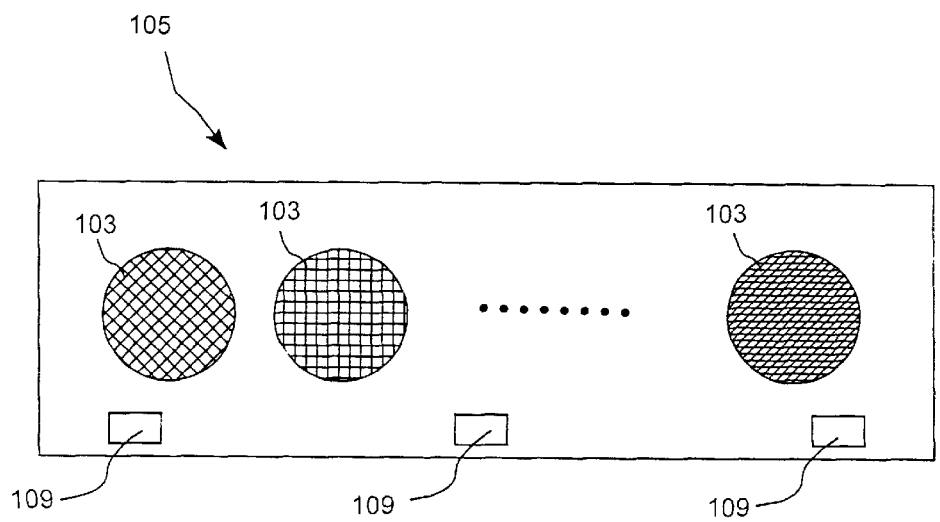
FIG. 5 is a front-view of a switching panel with diffractive optical elements according to the invention.

In FIG. 5, a carrier panel 105 is shown. The carrier panel 105 is attached to the actuator 101 by the hinges 107 that pass through holes 109. The carrier panel 105 holds one or more optical elements 103. The optical elements 103 may be diffractive, refractive, or holographic optical elements. Each optical element 103 is used to direct an input optical beam L1–Ln (FIG. 1) in a desired direction along a switching path to an output optical fiber 112. For example, FIG. 1 illustrates how beam L1 is redirected by an input switching element 100 along path 116 to an output switching element 120, where it is again redirected along path 118 to an output optical fiber Rn.

The optical elements 103 may convert a diverging optical wave into a plane wave that propagates toward the output fiber, and they can also convert a plane wave into a converging optical wave. The optical elements 103 may also be designed to direct the light beam to more than one direction simultaneously. The optical elements 103 are fabricated from a transparent material, such as glass, for the optical wavelengths of interest. The fabrication of the optical elements can be done as part of the micromachining process, or using micro-optic post-processing techniques they can be fabricated separately and then assembled with the rest of the optical switch 102. The cross-connect architecture using microelectronic fabrication techniques allows the fabrication of thousands of devices (including controller 108) on the same wafer, which plays a major role in cost reduction. The number of optical elements 103 in each carrier panel 105 can vary.

Figure 6:
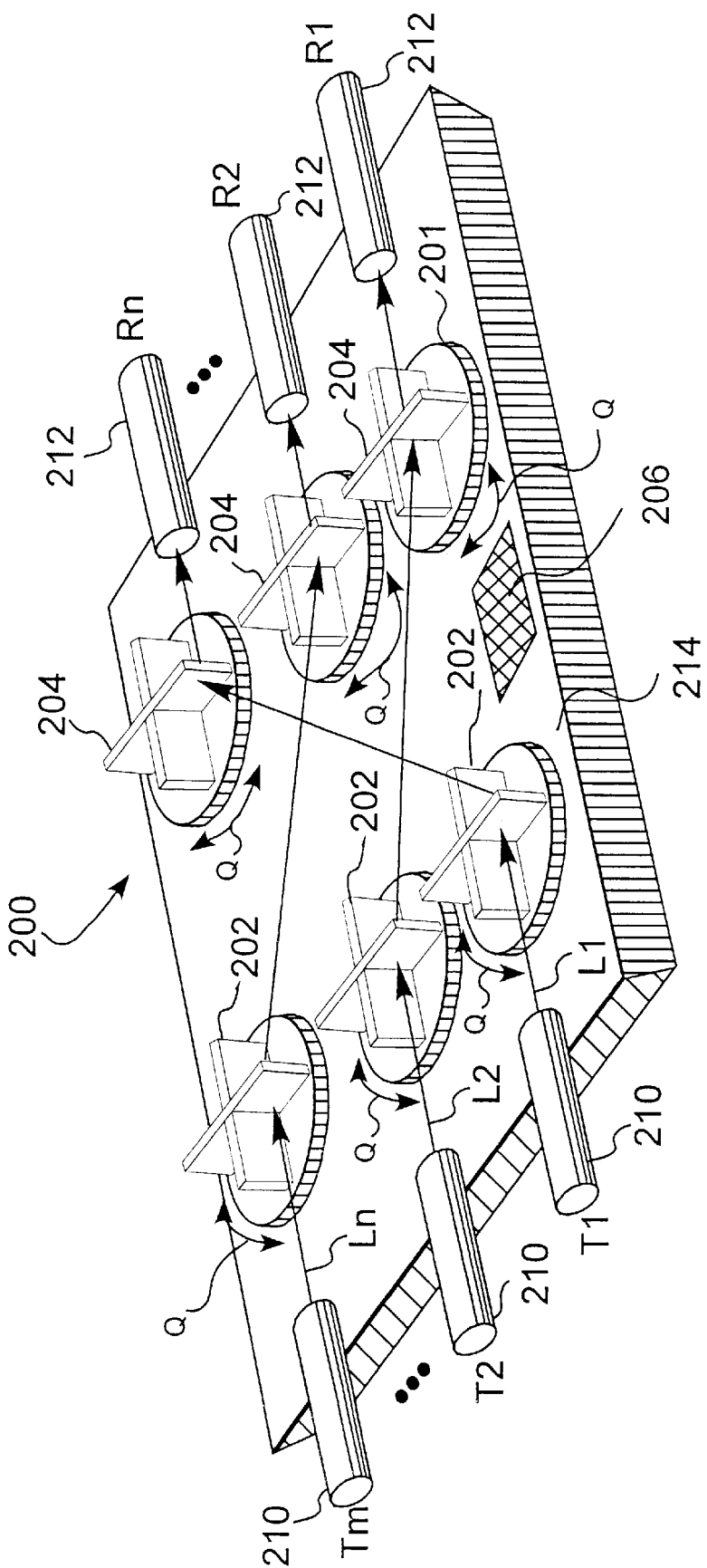
FIG. 6 is a diagrammatic view of an alternate embodiment of an optical switch using rotationally positioned optical switching elements according to the invention.

A second embodiment of an optical switch 200 using rotary actuation of optical switching elements is shown in FIG. 6. In this embodiment, the optical switch 200 includes one or more input optical switching elements 202 and one or more output optical switching elements 204. The optical switch 200 is formed on a base 214, which in a preferred embodiment is a microchip or semiconductor substrate. The optical switch 200 is used to redirect or switch one or more data transmitting input light beams L1–Ln exiting from one or more light transmitting input optical fibers 210 (T1–Tm) to one or more target devices, such as one or more light transmitting output optical fibers 212 (R1–Rn). The number of input optical fibers 210 connected to the optical switch 200 may be the same as or different than the number of output optical fibers 212. As each input light beam L1–Ln exits an input optical fiber 210, the light beam L1–Ln enters free space before encountering an input optical switching element 202. The input optical switching element 202 redirects the light beam L1–Ln to an appropriate output optical switching element 204 which in turn redirects the light beam onto an output optical fiber 212. An electronic controller 206, preferably integrated into the base 214, controls operation of the optical switch 200 including positioning of the switching elements 202, 204. The input optical switching elements 202 as well as the output optical switching elements 204 are positioned properly to redirect the optical beams emanating from one or more input fibers by actuators that rotate in quarter turns along the general direction indicated by arrow Q.

Figure 7:
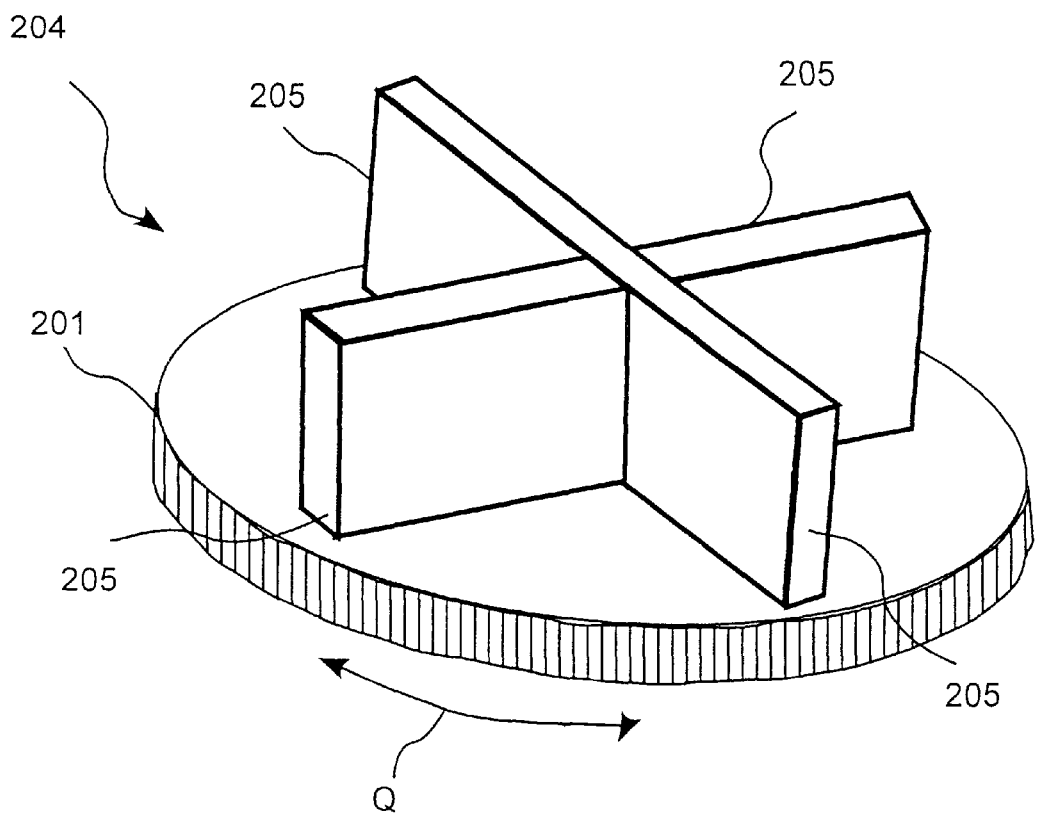
FIG. 7 is a perspective view of a rotational optical switching element shown in FIG. 6.
Figure 8:
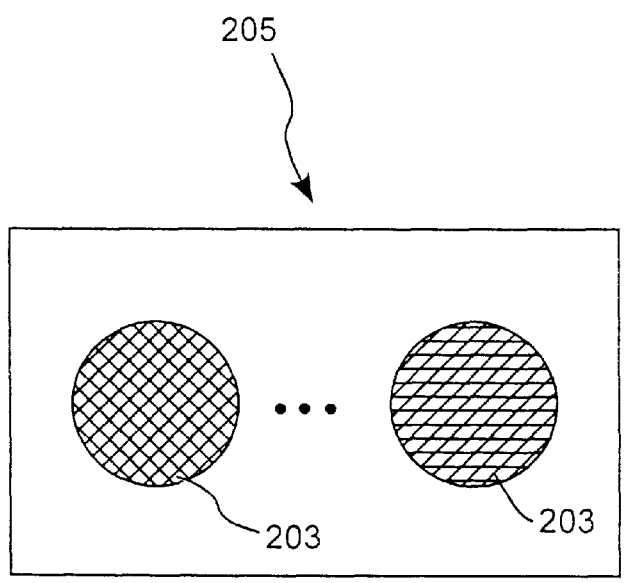
FIG. 8 is a front-view of a switching panel of the optical switching element of FIG. 6 with partially reflective optical elements according to the invention.

An output optical switching element 204 is shown in FIG. 7 and includes a pair of crossed optical device carrier panels 205 positioned on a rotary actuator 201. As shown in FIG. 8, each carrier panel 205 includes one or more diffractive (may also be refractive) optical elements 203. The base 214, the carrier panel 205, and the actuator 201 are made from a stiff resilient material, such as silicon-based materials commonly used in micromachining fabrications. The optical elements 203 are preferably fabricated from glass (such as poly-silicon or silicon dioxide) using a micromachining process or using post processes commonly used for micro-optics fabrications. The actuator 201 is a rotary type, such as that disclosed in M. Mehregany, "Silicon Microactuators," Advances in Actuators, Edited by: A. P. Dorey, et.al., (1995). To redirect an input beam L1–Ln, the rotary actuator 201 is rotated between a quarter to a three-quarter turn to position the proper optical element for redirecting the optical beam.

In FIG. 8, the carrier panel 205 is shown. The carrier panel 205 is attached to the rotary actuator 201. The optical elements 203 may be diffractive, refractive or holographic optical elements. These optical elements 203 are used to redirect an input light beam L1–Lm in a desired direction along a switching path to an output optical fiber 212. Also, these optical elements 203 may convert a diverging optical wave into a plane wave. Likewise, the optical elements 203 may convert a plane wave into a converging optical wave. The optical elements 203 may be designed to redirect the beam in multiple directions simultaneously (i.e., to split the beam). The optical elements 203 are preferably made from a transparent material, such as glass, for the optical wavelengths of interest. The fabrication of the optical elements 203 can be done as part of the micromachining process, or they can be fabricated separately and then assembled with the rest of the optical switch 200. The number of optical elements 203 in each carrier panel 205 can vary.

Figure 9:
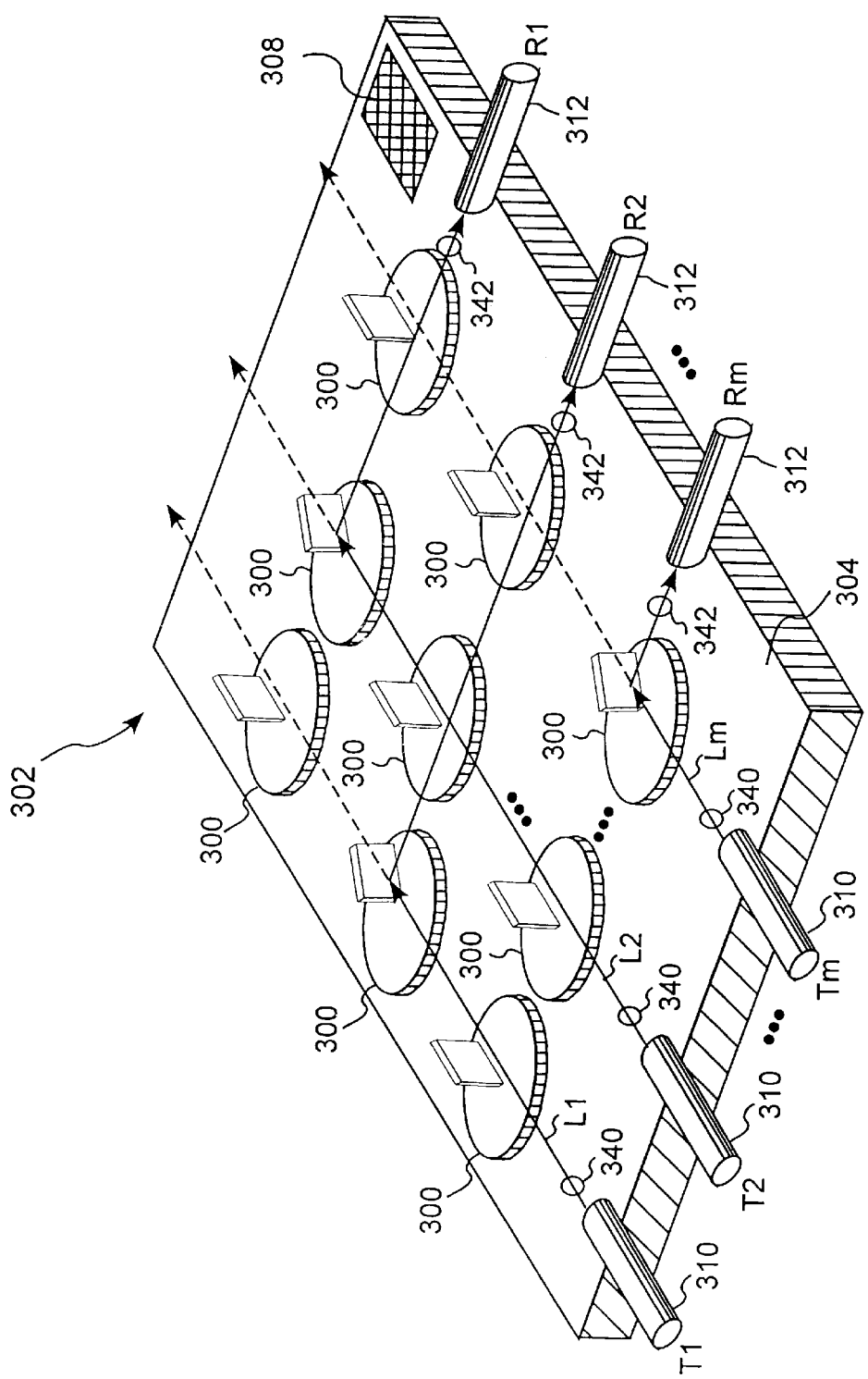
FIG. 9 is a diagrammatic view of a further embodiment of an optical switch using rotationally positioned reflective optical switching elements according to the invention.

Another embodiment of a rotary-type optical switch 302 is shown in FIG. 9. In this embodiment, the optical switch 302 includes one or more optical switching elements 300. The optical switch 302 is formed on a base 304, which in a preferred embodiment is a microchip or semiconductor substrate. The optical switch 302 is used to redirect or switch one or more data transmitting input light beams L1–Lm exiting from one or more light transmitting input optical fibers 310 (T1–Tm) to one or more target devices, such as one or more light transmitting output optical fibers 312 (R1–Rm). The number of input optical fibers 310 connected to the optical switch 302 may be the same as or different than the number of output optical fibers 312. As each input light beam L1–LM exits an input optical fiber 210, the light beam L1–Lm enters free space before encountering an optical lens 340 which narrows or collimates the beam L1–Lm and converts it to a plane wave. The beam impinges on one of the switching elements 300 which redirects the light beam L1–Lm to an appropriate output optical fiber 312. Before entering the output optical fiber 312, the beam L1–Lm is passed through a second lens 342 which converts the beam to a spherical wave for propagation through the output optical fiber 312. An electronic controller 308, preferably integrated into the base 304, controls operation of the optical switch 302 including positioning of the switching elements 300.

Figure 10:
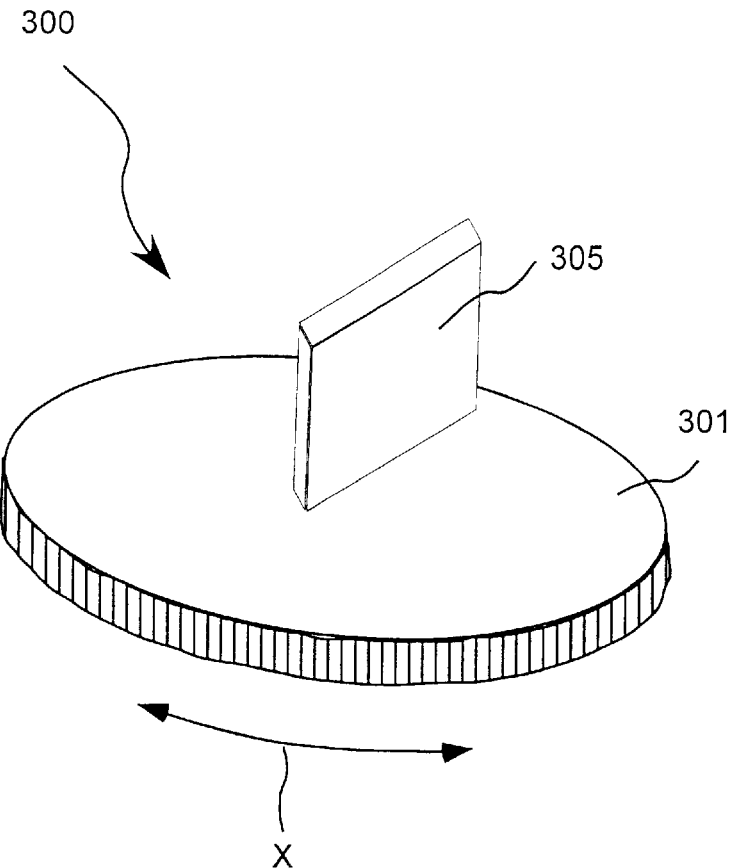
FIG. 10 is a perspective view of a rotational optical switching element shown in FIG. 9.
Figure 11:
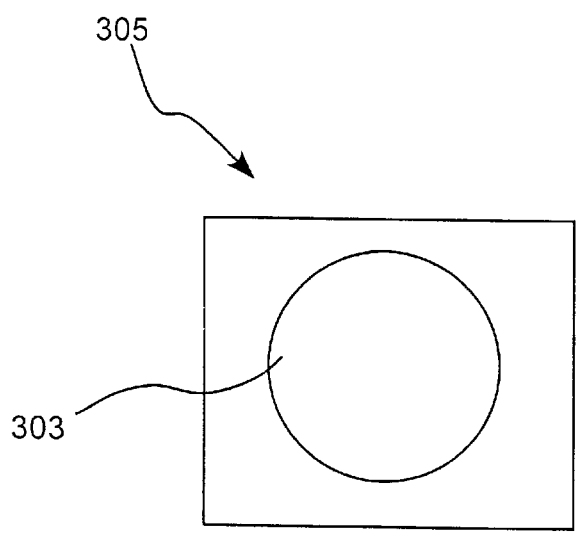
FIG. 11 is a front view of the optical switching element shown in FIG. 10.

As shown in FIG. 10, each optical switching element 300 includes an optical device carrier panels 305 positioned on a rotary actuator 301. As shown in FIG. 11, each carrier panel 305 includes one or more reflective (may also be diffractive) optical elements 303. The rotary actuator 301 (FIG. 10) is provided to enable rotation of the optical elements 303 into and out of the paths of the input light beams L1–Lm. As the light beam passes through an optical element 303, it gets redirected toward the proper output optical fiber 312. The base 304, the carrier panel 305, and the actuator 301 are made from a stiff resilient material, such as silicon-based materials commonly used in micromachining fabrications. The optical elements 303 are preferably fabricated from glass (such as poly-silicon or silicon dioxide) using a micromachining process or using post processes commonly employed for micro-optics fabrications.

The actuator 301 is a rotational type, refer to M. Mehregany, "Silicon Microactuators," Advances in Actuators, Edited by: A. P. Dorey, et.al., (1995). To change the direction of a beam L1–Lm, the actuator 301 is rotated about an eighth of a turn. When the carrier panel 305 is in a reflection position, the beam impinging on the appropriate optical element 303 is reflected (or partially reflected) toward an output optical fiber 312. When the carrier panel 305 is in a non-reflection position, the beam passes without reflection and no redirection of the beam will result. This cross-connect switching methodology can be used for broadcast switching applications.

It will be appreciated that an optical switch in accordance with the invention provides advantages over mirror-based optical cross-connect switches. Coupling losses of the present invention are significantly reduced. Diffractive as well as refractive optical elements can have up to 98% coupling efficiencies. Unlike most mirror-based switches, the present invention does not use so-called GRIN lenses which place severe constraints on the alignment of the optical beams. Also, the optical switch of this invention requires no power to maintain its current switching state while most mirror based switches require a continuous supply of power to maintain their switching position, which is a significant disadvantage in the event of a power failure. The speed of the introduced sliding actuator may present a clear advantage for high speed switching applications.

While the invention has been described in detail, it is to be expressly understood that it will be apparent to persons skilled in the relevant art that various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An apparatus for switching an optical signal from at least one input optical fiber to at least one output optical fiber, the apparatus comprising:
   a base;
   an input carrier element;
   a plurality of input optical elements attached to said input carrier element for guiding an optical signal in free space along a first portion of a free space switching path from an input optical fiber to an output optical fiber, said plurality of input optical elements including an optical element having refractive properties and an optical element having diffractive properties;
   an input actuator interconnecting said base and said input carrier element for positioning an input optical element to guide the optical signal along the first portion of the free space switching path;
   an output carrier element;
   a plurality of output optical elements attached to said output carrier element for guiding an optical signal in free space along a second portion of the free space switching path, said plurality of output optical elements including an optical element having refractive properties and an optical element having diffractive properties;
   an output actuator interconnecting said base and said output carrier element for positioning an output optical element to guide the optical signal along the second portion of the free space switching path; and
   a controller for controlling said actuators to position the optical elements along the free space switching path.

2. The apparatus of claim 1, wherein said input actuator includes a linear actuator for linearly moving the at least one input optical element into the first portion of the free space switching path.

3. The apparatus of claim 1, wherein said input actuator includes a rotary actuator for rotatably moving the at least one input optical element into the first portion of the free space switching path.

4. The apparatus of claim 1, wherein said output actuator includes a linear actuator for linearly moving the at least one output optical element into the second portion of the free space switching path.

5. The apparatus of claim 1, wherein said output actuator includes a rotary actuator for rotatably moving the at least one output optical element into the second portion of the free space switching path.

6. The apparatus of claim 1, wherein the number of input optical fibers is equal to the number of output optical fibers.

7. The apparatus of claim 1, wherein the number of input optical fibers is different than the number of output optical fibers.

8. The apparatus of claim 1, wherein said controller is integral with said base.

9. An optical switch comprising:
   a base;
   m number of input ports for receiving m number of input optical fibers which conduct data transmitting light beams;
   n number of output ports for receiving n number of output optical fibers which conduct data transmitting light beams;
   at least one input optical element for each of said m number of input ports, said at least one input optical element having optical properties for guiding a light beam exiting an input optical fiber in free space along a first portion of a free space switching path from the input optical fiber to an output optical element;
   at least one output optical element for each of said n number of output ports, said at least one output optical element having optical properties for guiding a light beam exiting an input optical element in free space to an output optical fiber along a second portion of the free space switching path;
   m number of input actuators attached to said base, each input actuator being operable to position an input optical element to guide a light beam along the first portion of the free space switching path;
   n number of output actuators attached to said base, each output actuator being operable to position an output optical element to guide a light beam along the second portion of the free space switching path;
   wherein all input optical elements and all output optical elements are positionable by the actuators to provide simultaneous switching of light beams from m number of input ports to n number of output ports where m and n are integers greater than one;
   a controller for controlling said actuators to position the optical elements along the free space switching path; and
   wherein each of said input and output actuators includes a linear actuator for linearly moving an optical element into the free space switching path.

* * * * *